US012628877B2

(12) United States Patent
Galloway et al.

(10) Patent No.: US 12,628,877 B2
(45) Date of Patent: *May 19, 2026

(54) ELECTRONIC SMOKING ARTICLE WITH HAPTIC FEEDBACK

(71) Applicant: RAI Strategic Holdings, Inc., Winston-Salem, NC (US)

(72) Inventors: Michael Ryan Galloway, Winston-Salem, NC (US); Raymond Charles Henry, Jr., Cary, NC (US); Glen Kimsey, Cary, NC (US); Frederic Philippe Ampolini, Winston-Salem, NC (US)

( * ) Notice: Subject to any disclaimer, the term of this patent is extended or adjusted under 35 U.S.C. 154(b) by 815 days.

This patent is subject to a terminal disclaimer.

(21) Appl. No.: 17/554,783

(22) Filed: Dec. 17, 2021

(65) Prior Publication Data

US 2022/0104552 A1 Apr. 7, 2022

Related U.S. Application Data

(63) Continuation of application No. 13/946,309, filed on Jul. 19, 2013, now Pat. No. 11,229,239.

(51) Int. Cl.
*A24F 40/53* (2020.01)
*A24F 40/42* (2020.01)
(Continued)

(52) U.S. Cl.
CPC .............. *A24F 40/53* (2020.01); *A24F 40/42* (2020.01); *G08B 6/00* (2013.01); *A24F 40/10* (2020.01)

(58) Field of Classification Search
CPC .......... A24F 40/40; A24F 40/50; A24F 40/51; A24F 40/53; A24F 40/60; A24F 40/65; A24F 40/10; A24F 40/42
See application file for complete search history.

(56) References Cited

U.S. PATENT DOCUMENTS

| | | | |
|---|---|---|---|
| 1,771,366 | A | 7/1930 | Wyss et al. |
| 2,057,353 | A | 10/1936 | Whittemore, Jr. |

(Continued)

FOREIGN PATENT DOCUMENTS

| | | |
|---|---|---|
| AU | 276250 | 7/1965 |
| CA | 2 641 869 | 5/2010 |

(Continued)

OTHER PUBLICATIONS

Bau, et al., "REVEL: Tactile Feedback Technology for Augmented Reality," ACM *Transactions on Graphics*, Aug. 5, 2012, vol. 31, No. 4, Article 89, URL, https://s3-us-west-I.amazonaws.com/disneyresearch/wp-content/uploads/20141222202845/REVEL.pdf.

(Continued)

*Primary Examiner* — Philip Y Louie
*Assistant Examiner* — Yana B Krinker
(74) *Attorney, Agent, or Firm* — Womble Bond Dickinson (US) LLP

(57) ABSTRACT

The present disclosure provides an electronic smoking article adapted to provide haptic feedback to a user. The smoking article can comprise a housing that includes a haptic feedback component, such as a vibration transducer. The smoking article can be formed of a control body and/or a cartridge, and the haptic feedback component may be present in any one or both of the control body and the cartridge. The haptic feedback component is adapted to generate a waveform that defines a status of the electronic smoking article. The disclosure also provides a method for providing haptic feedback in an electronic smoking article.

14 Claims, 2 Drawing Sheets

(51) Int. Cl.
*G08B 6/00* (2006.01)
*A24F 40/10* (2020.01)

(56) References Cited

U.S. PATENT DOCUMENTS 2,104,266 A 1/1938 McCormick
2,805,669 A 9/1957 Meriro
3,200,819 A 8/1965 Gilbert
3,316,919 A 5/1967 Green et al.
3,398,754 A 8/1968 Tughan
3,419,015 A 12/1968 Wochnowski
3,424,171 A 1/1969 Rooker
3,476,118 A 11/1969 Luttich
4,054,145 A 10/1977 Berndt et al.
4,131,117 A 12/1978 Kite et al.
4,150,677 A 4/1979 Osborne
4,190,046 A 2/1980 Virag
4,219,032 A 8/1980 Tabatznik et al.
4,259,970 A 4/1981 Green, Jr.
4,284,089 A 8/1981 Ray
4,303,083 A 12/1981 Burruss, Jr.
4,449,541 A 5/1984 Mays et al.
4,506,682 A 3/1985 Muller
4,635,651 A 1/1987 Jacobs
4,674,519 A 6/1987 Keritsis et al.
4,708,151 A 11/1987 Shelar
4,714,082 A 12/1987 Banerjee et al.
4,735,217 A 4/1988 Gerth et al.
4,756,318 A 7/1988 Clearman et al.
4,771,795 A 9/1988 White et al.
4,776,353 A 10/1988 Lilja et al.
4,793,365 A 12/1988 Sensabaugh, Jr. et al.
4,800,903 A 1/1989 Ray et al.
4,819,665 A 4/1989 Roberts et al.
4,821,749 A 4/1989 Toft et al.
4,830,028 A 5/1989 Lawson et al.
4,836,224 A 6/1989 Lawson et al.
4,836,225 A 6/1989 Sudoh
4,848,374 A 7/1989 Chard et al.
4,848,376 A 7/1989 Lilja et al.
4,874,000 A 10/1989 Tamol et al.
4,880,018 A 11/1989 Graves, Jr. et al.
4,887,619 A 12/1989 Burcham, Jr. et al.
4,907,606 A 3/1990 Lilja et al.
4,913,168 A 4/1990 Potter et al.
4,917,119 A 4/1990 Potter et al.
4,917,128 A 4/1990 Clearman et al.
4,922,901 A 5/1990 Brooks et al.
4,924,888 A 5/1990 Perfetti et al.
4,928,714 A 5/1990 Shannon
4,938,236 A 7/1990 Banerjee et al.
4,941,483 A 7/1990 Ridings et al.
4,941,484 A 7/1990 Clapp et al.
4,945,931 A 8/1990 Gori
4,947,874 A 8/1990 Brooks et al.
4,947,875 A 8/1990 Brooks et al.
4,972,854 A 11/1990 Kiernan et al.
4,972,855 A 11/1990 Kuriyama et al.
4,986,286 A 1/1991 Roberts et al.
4,987,906 A 1/1991 Young et al.
5,005,593 A 4/1991 Fagg
5,019,122 A 5/1991 Clearman et al.
5,022,416 A 6/1991 Watson
5,042,510 A 8/1991 Curtiss et al.
5,056,537 A 10/1991 Brown et al.
5,060,669 A 10/1991 White et al.
5,060,671 A 10/1991 Counts et al.
5,065,775 A 11/1991 Fagg
5,072,744 A 12/1991 Luke et al.
5,074,319 A 12/1991 White et al.
5,076,296 A 12/1991 Nystrom et al.
5,093,894 A 3/1992 Deevi et al.
5,095,921 A 3/1992 Losee et al.
5,097,850 A 3/1992 Braunshteyn et al.
5,099,862 A 3/1992 White et al.
5,099,864 A 3/1992 Young et al.
5,103,842 A 4/1992 Strang et al.
5,121,757 A 6/1992 White et al.
5,129,409 A 7/1992 White et al.
5,131,415 A 7/1992 Munoz et al.
5,143,097 A 9/1992 Sohn et al.
5,144,962 A 9/1992 Counts et al.
5,146,934 A 9/1992 Deevi et al.
5,159,940 A 11/1992 Hayward et al.
5,159,942 A 11/1992 Brinkley et al.
5,179,966 A 1/1993 Losee et al.
5,211,684 A 5/1993 Shannon et al.
5,220,930 A 6/1993 Gentry
5,224,498 A 7/1993 Deevi et al.
5,228,460 A 7/1993 Sprinkel, Jr. et al.
5,230,354 A 7/1993 Smith et al.
5,235,992 A 8/1993 Sensabaugh
5,243,999 A 9/1993 Smith
5,246,018 A 9/1993 Deevi et al.
5,249,586 A 10/1993 Morgan et al.
5,261,424 A 11/1993 Sprinkel, Jr.
5,269,327 A 12/1993 Counts et al.
5,285,798 A 2/1994 Banerjee et al.
5,293,883 A 3/1994 Edwards
5,301,694 A 4/1994 Raymond
5,303,720 A 4/1994 Banerjee et al.
5,318,050 A 6/1994 Gonzalez-Parra et al.
5,322,075 A 6/1994 Deevi et al.
5,322,076 A 6/1994 Brinkley et al.
5,339,838 A 8/1994 Young et al.
5,345,951 A 9/1994 Serrano et al.
5,353,813 A 10/1994 Deevi et al.
5,357,984 A 10/1994 Farrier et al.
5,360,023 A 11/1994 Blakley et al.
5,369,723 A 11/1994 Counts et al.
5,372,148 A 12/1994 McCafferty et al.
5,377,698 A 1/1995 Litzinger et al.
5,388,574 A 2/1995 Ingebrethsen et al.
5,388,594 A 2/1995 Counts et al.
5,408,574 A 4/1995 Deevi et al.
5,435,325 A 7/1995 Clapp et al.
5,445,169 A 8/1995 Brinkley et al.
5,468,266 A 11/1995 Bensalem et al.
5,468,936 A 11/1995 Deevi et al.
5,479,948 A 1/1996 Counts et al.
5,498,850 A 3/1996 Das
5,498,855 A 3/1996 Deevi et al.
5,499,636 A 3/1996 Baggett, Jr. et al.
5,501,237 A 3/1996 Young et al.
5,505,214 A 4/1996 Collins et al.
5,515,842 A 5/1996 Ramseyer et al.
5,530,225 A 6/1996 Hajaligol
5,551,450 A 9/1996 Hemsley
5,551,451 A 9/1996 Riggs et al.
5,564,442 A 10/1996 MacDonald et al.
5,573,692 A 11/1996 Das et al.
5,591,368 A 1/1997 Fleischhauer et al.
5,593,792 A 1/1997 Farrier et al.
5,595,577 A 1/1997 Bensalem et al.
5,596,706 A 1/1997 Sikk et al.
5,611,360 A 3/1997 Tang
5,613,504 A 3/1997 Collins et al.
5,613,505 A 3/1997 Campbell et al.
5,649,552 A 7/1997 Cho et al.
5,649,554 A 7/1997 Sprinkel et al.
5,659,656 A 8/1997 Das
5,665,262 A 9/1997 Hajaligol et al.
5,666,976 A 9/1997 Adams et al.
5,666,977 A 9/1997 Higgins et al.
5,666,978 A 9/1997 Counts et al.
5,692,525 A 12/1997 Counts et al.
5,692,526 A 12/1997 Adams et al.
5,708,258 A 1/1998 Counts et al.
5,711,320 A 1/1998 Martin
5,726,421 A 3/1998 Fleischhauer et al.
5,727,571 A 3/1998 Meiring et al.
5,730,158 A 3/1998 Collins et al.
5,750,964 A 5/1998 Counts et al.
5,799,663 A 9/1998 Gross et al.

(56) References Cited

U.S. PATENT DOCUMENTS 5,816,263 A 10/1998 Counts et al.
5,819,756 A 10/1998 Mielordt
5,829,453 A 11/1998 White et al.
5,865,185 A 2/1999 Collins et al.
5,865,186 A 2/1999 Volsey, II
5,878,752 A 3/1999 Adams et al.
5,880,439 A 3/1999 Deevi et al.
5,902,501 A 5/1999 Nunnally et al.
5,915,387 A 6/1999 Baggett, Jr. et al.
5,934,289 A 8/1999 Watkins et al.
5,954,979 A 9/1999 Counts et al.
5,967,148 A 10/1999 Harris et al.
6,026,820 A 2/2000 Baggett, Jr. et al.
6,033,623 A 3/2000 Deevi et al.
6,040,560 A 3/2000 Fleischhauer et al.
6,053,176 A 4/2000 Adams et al.
6,089,857 A 7/2000 Matsuura et al.
6,095,153 A 8/2000 Kessler et al.
6,116,247 A 9/2000 Banyasz et al.
6,119,700 A 9/2000 Fleischhauer et al.
6,125,853 A 10/2000 Susa et al.
6,125,855 A 10/2000 Nevett et al.
6,125,866 A 10/2000 Nichols et al.
6,155,268 A 12/2000 Takeuchi
6,164,287 A 12/2000 White
6,182,670 B1 2/2001 White
6,196,218 B1 3/2001 Voges
6,196,219 B1 3/2001 Hess et al.
6,216,706 B1 4/2001 Kumar et al.
6,289,898 B1 9/2001 Fournier et al.
6,349,729 B1 2/2002 Pham
6,357,671 B1 3/2002 Cewers
6,418,938 B1 7/2002 Fleischhauer et al.
6,446,426 B1 9/2002 Sweeney et al.
6,532,965 B1 3/2003 Abhulimen et al.
6,598,607 B2 7/2003 Adiga et al.
6,601,776 B1 8/2003 Oljaca et al.
6,615,840 B1 9/2003 Fournier et al.
6,688,313 B2 2/2004 Wrenn et al.
6,701,936 B2 3/2004 Shafer et al.
6,715,494 B1 4/2004 McCoy
6,730,832 B1 5/2004 Dominguez et al.
6,772,756 B2 8/2004 Shayan
6,803,545 B2 10/2004 Blake et al.
6,803,550 B2 10/2004 Sharpe et al.
6,810,883 B2 11/2004 Felter et al.
6,854,461 B2 2/2005 Nichols
6,854,470 B1 2/2005 Pu
6,994,096 B2 2/2006 Rostami et al.
7,011,096 B2 3/2006 Li et al.
7,017,585 B2 3/2006 Li et al.
7,025,066 B2 4/2006 Lawson et al.
7,117,867 B2 10/2006 Cox et al.
7,163,015 B2 1/2007 Moffitt
7,173,322 B2 2/2007 Cox et al.
7,185,659 B2 3/2007 Sharpe et al.
7,234,470 B2 6/2007 Yang
7,290,549 B2 11/2007 Banerjee et al.
7,293,565 B2 11/2007 Griffin et al.
7,392,809 B2 7/2008 Larson et al.
7,513,253 B2 4/2009 Kobayashi et al.
7,647,932 B2 1/2010 Cantrell et al.
7,690,385 B2 4/2010 Moffitt
7,692,123 B2 4/2010 Baba et al.
7,726,320 B2 6/2010 Robinson et al.
7,775,459 B2 8/2010 Martens, III et al.
7,810,505 B2 10/2010 Yang
7,832,410 B2 11/2010 Hon
7,845,359 B2 12/2010 Montaser
7,878,209 B2 2/2011 Newbery et al.
7,896,006 B2 3/2011 Hamano et al.
8,066,010 B2 11/2011 Newbery et al.
8,079,371 B2 12/2011 Robinson et al.
8,127,772 B2 3/2012 Montaser
8,156,944 B2 4/2012 Han
8,365,742 B2 2/2013 Hon
8,375,957 B2 2/2013 Hon
8,393,331 B2 3/2013 Hon
9,854,841 B2 1/2018 Ampolini et al.
2002/0054060 A1 5/2002 Schena
2002/0146242 A1 10/2002 Vieira
2003/0016207 A1 1/2003 Tremblay et al.
2003/0131859 A1 7/2003 Li et al.
2003/0226837 A1 12/2003 Blake et al.
2004/0020500 A1 2/2004 Wrenn et al.
2004/0129280 A1 7/2004 Woodson et al.
2004/0149296 A1 8/2004 Rostami et al.
2004/0200488 A1 10/2004 Felter et al.
2004/0224435 A1 11/2004 Shibata et al.
2004/0226568 A1 11/2004 Takeuchi et al.
2004/0255965 A1 12/2004 Perfetti et al.
2005/0016549 A1 1/2005 Banerjee et al.
2005/0016550 A1 1/2005 Katase
2005/0066986 A1 3/2005 Nestor et al.
2005/0151126 A1 7/2005 Yamakawa et al.
2005/0172976 A1 8/2005 Newman et al.
2005/0274390 A1 12/2005 Banerjee et al.
2006/0016453 A1 1/2006 Kim
2006/0032501 A1 2/2006 Hale et al.
2006/0070633 A1 4/2006 Rostami et al.
2006/0162733 A1 7/2006 McGrath et al.
2006/0185687 A1 8/2006 Hearn et al.
2006/0196518 A1 9/2006 Hon
2007/0074734 A1 4/2007 Braunshteyn et al.
2007/0102013 A1 5/2007 Adams et al.
2007/0215167 A1 9/2007 Crooks et al.
2007/0283972 A1 12/2007 Monsees et al.
2008/0092912 A1 4/2008 Robinson et al.
2008/0149118 A1 6/2008 Oglesby et al.
2008/0245377 A1 10/2008 Marshall et al.
2008/0257367 A1 10/2008 Paterno et al.
2008/0276947 A1 11/2008 Martzel
2008/0302374 A1 12/2008 Wengert et al.
2009/0065010 A1 3/2009 Shands
2009/0095311 A1 4/2009 Hon
2009/0095312 A1 4/2009 Herbrich et al.
2009/0107492 A1 4/2009 Ooida
2009/0126745 A1 5/2009 Hon
2009/0188490 A1 7/2009 Hon
2009/0230117 A1 9/2009 Fernando et al.
2009/0260641 A1 10/2009 Monsees et al.
2009/0260642 A1 10/2009 Monsees et al.
2009/0272379 A1 11/2009 Thorens et al.
2009/0283103 A1 11/2009 Nielsen et al.
2009/0293892 A1 12/2009 Williams et al.
2009/0320863 A1 12/2009 Fernando et al.
2009/0324206 A1 12/2009 Young et al.
2010/0006113 A1 1/2010 Urtsev et al.
2010/0024834 A1 2/2010 Oglesby et al.
2010/0043809 A1 2/2010 Magnon
2010/0059070 A1 3/2010 Potter et al.
2010/0059073 A1 3/2010 Hoffmann et al.
2010/0065075 A1 3/2010 Banerjee et al.
2010/0083959 A1 4/2010 Siller
2010/0163063 A1 7/2010 Fernando et al.
2010/0200006 A1 8/2010 Robinson et al.
2010/0229881 A1 9/2010 Hearn
2010/0242974 A1 9/2010 Pan
2010/0242976 A1 9/2010 Katayama et al.
2010/0258139 A1 10/2010 Onishi et al.
2010/0300467 A1 12/2010 Kuistilla et al.
2010/0307518 A1 12/2010 Wang
2010/0313901 A1 12/2010 Fernando et al.
2011/0005535 A1 1/2011 Xiu
2011/0011396 A1 1/2011 Fang
2011/0036346 A1 2/2011 Cohen et al.
2011/0036363 A1 2/2011 Urtsev et al.
2011/0036365 A1 2/2011 Chong et al.
2011/0073121 A1 3/2011 Levin et al.
2011/0075835 A1* 3/2011 Hill ........................ G06F 3/016 340/407.1
2011/0088707 A1 4/2011 Hajaligol
2011/0094523 A1 4/2011 Thorens et al.
2011/0120480 A1 5/2011 Brenneise

(56) References Cited

U.S. PATENT DOCUMENTS

| | | | |
|---|---|---|---|
| 2011/0126847 A1 | 6/2011 | Zuber et al. | |
| 2011/0126848 A1 | 6/2011 | Zuber et al. | |
| 2011/0155153 A1 | 6/2011 | Thorens et al. | |
| 2011/0155718 A1 | 6/2011 | Greim et al. | |
| 2011/0162663 A1 | 7/2011 | Bryman | |
| 2011/0168194 A1 | 7/2011 | Hon | |
| 2011/0180082 A1 | 7/2011 | Banerjee et al. | |
| 2011/0226236 A1 | 9/2011 | Buchberger | |
| 2011/0265806 A1* | 11/2011 | Alarcon | A24F 40/485 131/273 |
| 2011/0309157 A1 | 12/2011 | Yang et al. | |
| 2012/0042885 A1 | 2/2012 | Stone et al. | |
| 2012/0048266 A1* | 3/2012 | Alelov | A61M 15/0003 128/203.14 |
| 2012/0060853 A1 | 3/2012 | Robinson et al. | |
| 2012/0111347 A1 | 5/2012 | Hon | |
| 2012/0132643 A1 | 5/2012 | Choi et al. | |
| 2012/0199146 A1 | 8/2012 | Marangos | |
| 2012/0231464 A1 | 9/2012 | Yu et al. | |
| 2012/0249462 A1* | 10/2012 | Flanagan | G06F 3/016 340/407.1 |
| 2012/0279512 A1 | 11/2012 | Hon | |
| 2012/0318882 A1 | 12/2012 | Abehasera | |
| 2013/0002411 A1 | 1/2013 | Henderson et al. | |
| 2013/0037041 A1 | 2/2013 | Worm et al. | |
| 2013/0042865 A1 | 2/2013 | Monsees et al. | |
| 2013/0081642 A1 | 4/2013 | Safari | |
| 2013/0104916 A1 | 5/2013 | Bellinger et al. | |
| 2013/0106589 A1 | 5/2013 | Posamentier | |
| 2013/0127607 A1 | 5/2013 | Parker et al. | |
| 2013/0255702 A1 | 10/2013 | Griffith, Jr. et al. | |
| 2013/0306084 A1 | 11/2013 | Flick | |
| 2013/0340775 A1 | 12/2013 | Juster et al. | |

FOREIGN PATENT DOCUMENTS

| | | |
|---|---|---|
| CA | 2 752 255 | 8/2010 |
| CN | 1541577 | 11/2004 |
| CN | 2719043 | 8/2005 |
| CN | 200997909 | 1/2008 |
| CN | 101116542 | 2/2008 |
| CN | 101176805 | 5/2008 |
| CN | 201379072 | 1/2010 |
| CN | 102301415 | 12/2011 |
| CN | 202085722 | 12/2011 |
| DE | 10 2006 004 484 | 8/2007 |
| DE | 102006041042 | 3/2008 |
| DE | 20 2009 010 400 | 11/2009 |
| EP | 0 295 122 | 12/1988 |
| EP | 0 430 566 | 6/1991 |
| EP | 0 845 220 | 6/1998 |
| EP | 1 618 803 | 1/2006 |
| EP | 2 316 286 | 5/2011 |
| EP | 2 468 116 | 6/2012 |
| EP | 2381340 | 3/2018 |
| EP | 2903465 | 3/2018 |
| GB | 1444461 | 7/1976 |
| GB | 2469850 | 11/2010 |
| JP | H 08205413 | 8/1996 |
| JP | H11196497 A | 7/1999 |
| JP | 2012108885 | 6/2012 |
| JP | 2013511108 | 3/2013 |
| JP | 2013524835 | 6/2013 |
| WO | WO 1986/02528 | 5/1986 |
| WO | WO 1997/48293 | 12/1997 |
| WO | WO 02/37990 | 5/2002 |
| WO | WO 2004/043175 | 5/2004 |
| WO | WO 2007/131449 | 11/2007 |
| WO | WO 2009/105919 | 9/2009 |
| WO | WO 2009/155734 | 12/2009 |
| WO | WO 2010/003480 | 1/2010 |
| WO | WO 2010/045670 | 4/2010 |
| WO | WO 2010/073122 | 7/2010 |
| WO | WO 2010/091593 | 8/2010 |
| WO | WO 2010/118644 | 10/2010 |
| WO | WO 2010/140937 | 12/2010 |
| WO | WO 2011/010334 | 1/2011 |
| WO | WO 2011/081558 | 7/2011 |
| WO | WO 2011/137453 | 11/2011 |
| WO | WO 2011/160788 | 12/2011 |
| WO | WO 2012/061722 | 5/2012 |
| WO | WO 2012/085203 | 6/2012 |
| WO | WO 2013/089551 | 6/2013 |
| WO | WO 2013/093469 | 6/2013 |
| WO | WO 2013/093470 | 6/2013 |
| WO | WO 2014/058678 | 4/2014 |
| WO | WO 2015/009838 | 1/2015 |

OTHER PUBLICATIONS

Basdogan et al., "A Review of Surface Haptics: Enabling Tactile Effects on Touch Surfaces", IEEE Transactions on Haptics, vol. 13, Issue 3, Apr. 27, 2020.

Datasheet for DRV2605 Haptic Driver, Dec. 2012 Revision.

Datasheet for DRV8662 Piezo Haptic Driver, Jun. 2011.

Etter "The Electronic Cigarette: An Alternative to Tobacco?" *CreateSpace Independent Publishing Platform*; 1st Edition, Feb. 4, 2013.

Kern, Thorsten A., Editor, "Engineering Haptic Devices", Springer 2009.

Merriam-Webster dictionary entry for 'driver' from the Wayback Machine as logged on Apr. 6, 2013—https://web.archive.org/web/20130406022552/https:/www/,erroa,-webster.com/dictionary/diriver.

User's Guide for DRV8662 Piezo Haptics Driver Evaluation Module, Aug. 2011 Revision.

User's Guide for DRV2605 ERM, LRA Haptic Driver Evaluation Kit, Jan. 2013.

Video by Texas Instruments: "DRV2605 ERM/LRA Haptics Driver Overview"—https: //www.youtube.com/watch?v=v5nf-8N717g, Mar. 26, 2013.

Wikipedia Page—Electronic Cigarettes, Jul. 16, 2013.

* cited by examiner

ELECTRONIC SMOKING ARTICLE WITH HAPTIC FEEDBACK

CROSS-REFERENCE TO RELATED APPLICATIONS

The present application is a continuation of U.S. patent application Ser. No. 13/946,309, filed Jul. 19, 2013, the disclosure of which is incorporated herein by reference in its entirety.

FIELD OF THE DISCLOSURE

The present disclosure relates to aerosol delivery devices such as smoking articles, and more particularly to means for providing an indication of a status of such devices to a user thereof. The smoking articles may be configured to heat a material, which may be made or derived from tobacco or otherwise incorporate tobacco, to form an inhalable substance for human consumption.

BACKGROUND

Many smoking devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 7,726,320 to Robinson et al., U.S. patent application Ser. No. 13/432,406, filed Mar. 28, 2012, U.S. patent application Ser. No. 13/536,438, filed Jun. 28, 2012, U.S. patent application Ser. No. 13/602,871, filed Sep. 4, 2012, and U.S. patent application Ser. No. 13/647,000, filed Oct. 8, 2012, which are incorporated herein by reference.

Certain tobacco products that have employed electrical energy to produce heat for smoke or aerosol formation, and in particular, certain products that have been referred to as electronic cigarette products, have been commercially available throughout the world. Representative products that resemble many of the attributes of traditional types of cigarettes, cigars or pipes have been marketed as ACCORD® by Philip Morris Incorporated; ALPHA™, JOVE 510™ and M4™ by InnoVapor LLC; CIRRUS™ and FLING™ by White Cloud Cigarettes; COHITA™, COLIBRI™, ELITE CLASSIC™, MAGNUM™, PHANTOM™ and SENSE™ by Epuffer® International Inc.; DUOPRO™, STORM™ and VAPORKING® by Electronic Cigarettes, Inc.; EGAR™ by Egar Australia; eGo-C™ and eGo-T™ by Joyetech; ELUSION™ by Elusion UK Ltd; EONSMOKE® by Eonsmoke LLC; GREEN SMOKE® by Green Smoke Inc. USA; GREENARETTE™ by Greenarette LLC; HALLIGAN™, HENDU™, JET™, MAXXQ™, PINK™ and PITBULL™ by Smoke Stik®; HEATBAR™ by Philip Morris International, Inc.; HYDRO IMPERIAL™ and LXE™ from Crown7; LOGIC™ and THE CUBAN™ by LOGIC Technology; LUCI® by Luciano Smokes Inc.; METRO® by Nicotek, LLC; NJOY® and ONEJOY™ by Sottera, Inc.; NO. 7™ by SS Choice LLC; PREMIUM ELECTRONIC CIGARETTE™ by PremiumEstore LLC; RAPP E-MYSTICK™ by Ruyan America, Inc.; RED DRAGON™ by Red Dragon Products, LLC; RUYAN® by Ruyan Group (Holdings) Ltd.; SMART SMOKER® by The Smart Smoking Electronic Cigarette Company Ltd.; SMOKE ASSIST® by Coastline Products LLC; SMOKING EVERYWHERE® by Smoking Everywhere, Inc.; V2CIGS™ by VMR Products LLC; VAPOR NINE™ by VaporNine LLC; VAPOR4LIFE® by Vapor 4 Life, Inc.; VEPPO™ by E-CigaretteDirect, LLC and VUSE® by R. J. Reynolds Vapor Company. Yet other electrically powered aerosol delivery devices, and in particular those devices that have been characterized as so-called electronic cigarettes, have been marketed under the tradenames BLU™; COOLER VISIONS™; DIRECT E-CIG™; DRAGONFLY™; EMIST™; EVERSMOKE™; GAMUCCI®; HYBRID FLAME™; KNIGHT STICKS™; ROYAL BLUES™; SMOKETIP® and SOUTH BEACH SMOKE™.

It would be desirable to provide a smoking article that employs heat produced by electrical energy to provide the sensations of cigarette, cigar, or pipe smoking, that does so without combusting tobacco to any significant degree, that does so without the need of a combustion heat source, and that does so without necessarily delivering considerable quantities of incomplete combustion and pyrolysis products. Further, advances with respect to manufacturing electronic smoking articles would be desirable.

SUMMARY OF THE DISCLOSURE

The present disclosure relates to materials and combinations thereof useful in electronic smoking articles and like personal devices. In particular, the present disclosure relates to elements adapted to provide notification of a status of the electronic smoking article. More specifically, the notification can be haptic. Thus, the smoking article or like device can be adapted to provide a tactile indication of a status thereof. Such tactile indication can be provided in addition to a further indication, such as a visual or audio indication. In certain embodiments, the present disclosure relates to a haptic electronic smoking article, a tactile electronic smoking article, or a vibrating electronic smoking article.

On some embodiments, the present disclosure particularly can provide an electronic smoking article comprising a housing including a haptic feedback component. The electronic smoking article further can comprise a microcontroller in electrical communication with the haptic feedback component. In particular, the microcontroller can be adapted to instruct the haptic feedback component to generate one or more different waveforms defining a status of the electronic smoking article. The instruction from the microcontroller specifically can correspond to an input. Further, the electronic smoking article can comprise a haptic driver in electrical communication with the microcontroller and the haptic feedback component. The haptic driver can be adapted to convert one or more signals from the microcontroller to an output that directs the haptic feedback component to form the haptic feedback defined by the waveform.

In some embodiments, the haptic feedback component can be a vibrating haptic actuator. For example, the vibrating haptic actuator can comprise an eccentric rotating mass (ERM) motor. In particular, the vibrating haptic actuator can be in a cylindrical form factor or can be in a coin form factor. In another non-limiting example, the vibrating haptic actuator can comprise a linear resonant actuator (LRA). As yet further examples, the vibrating haptic actuator can be adapted for electroactive polymer actuation, can be adapted for piezoelectric actuation, can be adapted for electrostatic actuation, or can be adapted for audio wave actuation. In other embodiments, the haptic feedback component can be adapted for reverse-electrovibration.

In some embodiments, the housing of the electronic smoking article can define a control body. In particular, the control body can comprise the haptic feedback component, a microcontroller, and an electrical power source. The control body further can comprise a flow sensor. The electronic smoking article also can comprise a cartridge. In particular, the cartridge can comprise a housing including a heater and an aerosol precursor composition. The cartridge further can comprise a reservoir adapted to contain the aerosol precursor composition. The composition may within the reservoir or may be absorbed or adsorbed by the reservoir. The cartridge also can comprise a transport element adapted to transport the aerosol precursor composition from the reservoir to the heater.

The shape and dimensions of the haptic feedback component can vary. Preferably, the haptic feedback component can be shaped and dimensioned for inclusion in a substantially cylindrical housing. In some embodiments, the haptic feedback component can have a width of about 8 mm or less.

In other embodiments, the present disclosure can relate to a method for providing haptic feedback in an electronic smoking article. In some embodiments, the method can comprise the following steps: providing the electronic smoking article comprising a housing including a haptic feedback component and a microcontroller; generating an input to the microcontroller; delivering an instruction from the microcontroller to the haptic feedback component; and generating one or more different waveforms from the haptic feedback component. In particular, the one or more different waveforms can define a status of the electronic smoking article.

BRIEF DESCRIPTION OF THE FIGURES

Figure 1:
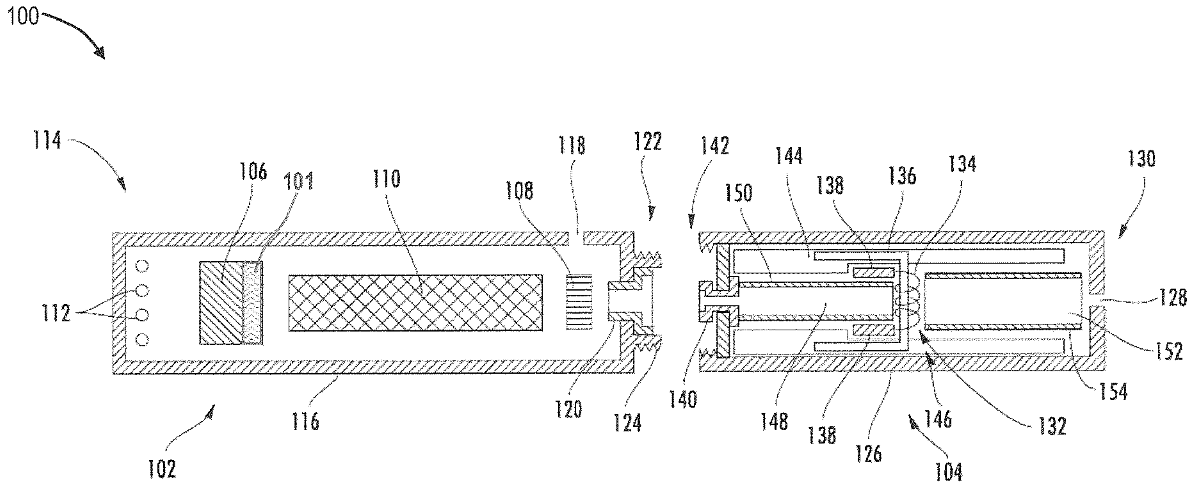
Figure 2:
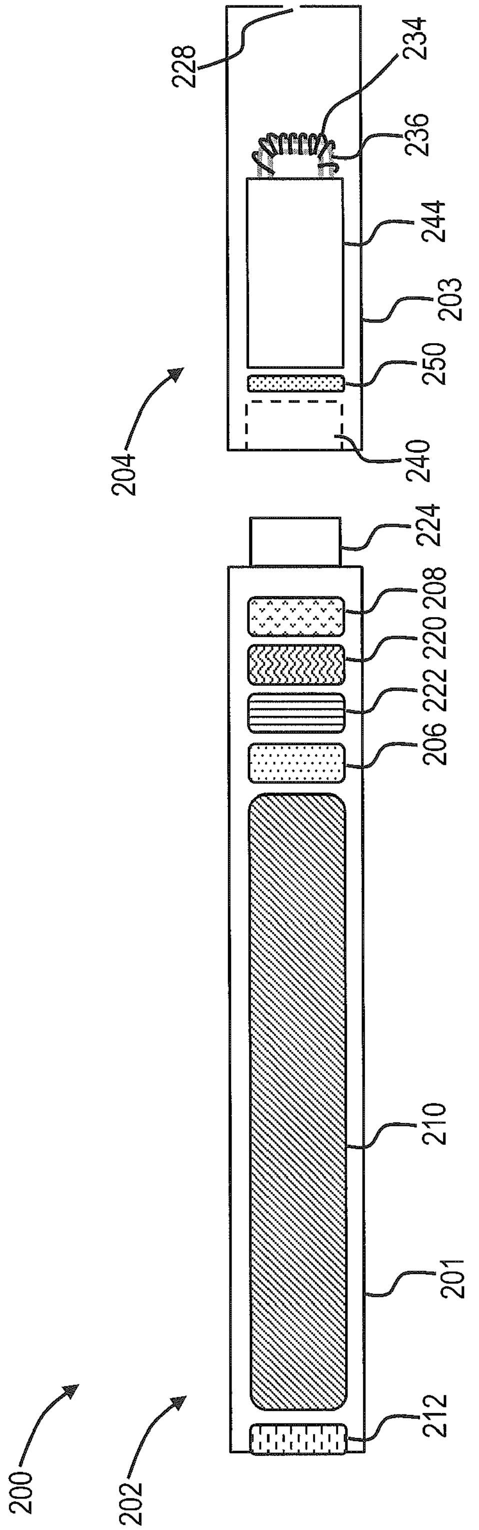

Having thus described the disclosure in the foregoing general terms, reference will now be made to the accompanying drawings, which are not necessarily drawn to scale, and wherein:

FIG. 1 illustrates a sectional view through an electronic smoking article comprising a control body and a cartridge according to an example embodiment of the present disclosure; and FIG. 2 illustrates a sectional view through an electronic smoking article comprising a cartridge and a control body including a haptic feedback component according to an example embodiment of the present disclosure.

DETAILED DESCRIPTION

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure provides descriptions of mechanisms, components, features, and methods configured to provide haptic feedback. While the mechanisms are generally described herein in terms of embodiments associated with aerosol delivery devices or smoking articles, such as so-called "e-cigarettes," it should be understood that the mechanisms, components, features, and methods may be embodied in many different forms and associated with a variety of articles.

In this regard, the present disclosure provides descriptions of aerosol delivery devices that use electrical energy to heat a material (preferably without combusting the material to any significant degree) to form an inhalable substance; such articles most preferably being sufficiently compact to be considered "hand-held" devices. An aerosol delivery device may provide some or all of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe, without any substantial degree of combustion of any component of that article or device. The aerosol delivery device may not produce smoke in the sense of the aerosol resulting from by-products of combustion or pyrolysis of tobacco, but rather, that the article or device may yield vapors (including vapors within aerosols that can be considered to be visible aerosols that might be considered to be described as smoke-like) resulting from volatilization or vaporization of certain components of the article or device. In highly preferred embodiments, aerosol delivery devices may incorporate tobacco and/or components derived from tobacco.

Aerosol delivery devices of the present disclosure also can be characterized as being vapor-producing articles, smoking articles, or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

In use, aerosol delivery devices of the present disclosure may be subjected to many of the physical actions employed by an individual in using a traditional type of smoking article (e.g., a cigarette, cigar or pipe that is employed by lighting and inhaling tobacco). For example, the user of an aerosol delivery device of the present disclosure can hold that article much like a traditional type of smoking article, draw on one end of that article for inhalation of aerosol produced by that article, take puffs at selected intervals of time, etc.

Aerosol delivery devices of the present disclosure generally include a number of components provided within an outer body or shell. The overall design of the outer body or shell can vary, and the format or configuration of the outer body that can define the overall size and shape of the aerosol delivery device can vary. Typically, an elongated body resembling the shape of a cigarette or cigar can be a formed from a single, unitary shell; or the elongated body can be formed of two or more separable pieces. For example, an aerosol delivery device can comprise an elongated shell or body that can be substantially tubular in shape and, as such, resemble the shape of a conventional cigarette or cigar. In one embodiment, all of the components of the aerosol delivery device are contained within one outer body or shell. Alternatively, an aerosol delivery device can comprise two or more shells that are joined and are separable. For example, an aerosol delivery device can possess at one end a control body comprising an outer body or shell containing one or more reusable components (e.g., a rechargeable battery and various electronics for controlling the operation of that article), and at the other end and removably attached thereto an outer body or shell containing a disposable portion (e.g., a disposable flavor-containing cartridge). More specific formats, configurations and arrangements of components within the single shell type of unit or within a multi-piece separable shell type of unit will be evident in light of the further disclosure provided herein. Additionally, various aerosol delivery device designs and component arrangements can be appreciated upon consideration of the commercially available electronic aerosol delivery devices, such as those representative products listed in the background art section of the present disclosure.

Aerosol delivery devices of the present disclosure most preferably comprise some combination of a power source (i.e., an electrical power source), at least one control component (e.g., means for actuating, controlling, regulating and ceasing power for heat generation, such as by controlling electrical current flow the power source to other components of the article—e.g., a microcontroller), a heater or heat generation component (e.g., an electrical resistance heating element or component commonly referred to as an "atomizer"), and an aerosol precursor composition (e.g., commonly a liquid capable of yielding an aerosol upon application of sufficient heat, such as ingredients commonly referred to as "smoke juice," "e-liquid" and "e-juice"), and a mouthend region or tip for allowing draw upon the aerosol delivery device for aerosol inhalation (e.g., a defined air flow path through the article such that aerosol generated can be withdrawn therefrom upon draw). Exemplary formulations for aerosol precursor materials that may be used according to the present disclosure are described in U.S. Pat. Pub. No. 2013/0008457 to Zheng et al., the disclosure of which is incorporated herein by reference in its entirety. Devices of the present disclosure also particularly include a haptic feedback component, which may be present in a single-body article, a control body of a multi-body article, or a cartridge of a multi-body article.

Alignment of the components within the aerosol delivery device can vary. In specific embodiments, the aerosol precursor composition can be located near an end of the article (e.g., within a cartridge, which in certain circumstances can be replaceable and disposable), which may be proximal to the mouth of a user so as to maximize aerosol delivery to the user. Other configurations, however, are not excluded. Generally, the heating element can be positioned sufficiently near the aerosol precursor composition so that heat from the heating element can volatilize the aerosol precursor (as well as one or more flavorants, medicaments, or the like that may likewise be provided for delivery to a user) and form an aerosol for delivery to the user. When the heating element heats the aerosol precursor composition, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof. Additionally, the selection of various aerosol delivery device components can be appreciated upon consideration of the commercially available electronic aerosol delivery devices, such as those representative products listed in the background art section of the present disclosure.

An aerosol delivery device incorporates a battery or other electrical power source to provide current flow sufficient to provide various functionalities to the article, such as resistive heating, powering of control systems, powering of indicators, and the like. The power source can take on various embodiments. Preferably, the power source is able to deliver sufficient power to rapidly heat the heating member to provide for aerosol formation and power the article through use for the desired duration of time. The power source preferably is sized to fit conveniently within the aerosol delivery device so that the aerosol delivery device can be easily handled; and additionally, a preferred power source is of a sufficiently light weight to not detract from a desirable smoking experience.

One example embodiment of an aerosol delivery device 100 is provided in FIG. 1. As seen in the cross-section illustrated therein, the aerosol delivery device 100 can comprise a control body 102 and a cartridge 104 that can be permanently or detachably aligned in a functioning relationship. Although a threaded engagement is illustrated in FIG. 1, it is understood that further means of engagement may be employed, such as a press-fit engagement, interference fit, a magnetic engagement, or the like.

In specific embodiments, one or both of the control body 102 and the cartridge 104 may be referred to as being disposable or as being reusable. For example, the control body may have a replaceable battery or a rechargeable battery and thus may be combined with any type of recharging technology, including connection to a typical electrical outlet, connection to a car charger (i.e., cigarette lighter receptacle), and connection to a computer, such as through a universal serial bus (USB) cable. For example, an adaptor including a USB connector at one end and a control body connector at an opposing end is disclosed in U.S. patent application Ser. No. 13/840,264, filed Mar. 15, 2013, which is incorporated herein by reference in its entirety. Further, in some embodiments the cartridge may comprise a single-use cartridge, as disclosed in U.S. patent application Ser. No. 13/603,612, filed Sep. 5, 2012, which is incorporated herein by reference in its entirety.

In the exemplified embodiment, the control body 102 includes a control component 106 (e.g., a microcontroller), a flow sensor 108, and a battery 110, which can be variably aligned, and can include a plurality of indicators 112 at a distal end 114 of an outer body 116. The indicators 112 can be provided in varying numbers and can take on different shapes and can even be an opening in the body (such as for release of sound when such indicators are present). In the exemplified embodiment, a haptic feedback component 101 is included with the control component 106. As such, the haptic feedback component may be integrated with one or more components of a smoking article.

An air intake 118 may be positioned in the outer body 116 of the control body 102. A coupler 120 also is included at the proximal attachment end 122 of the control body 102 and may extend into a control body projection 124 to allow for ease of electrical connection with an atomizer or a component thereof, such as a resistive heating element (described below) when the cartridge 104 is attached to the control body. Although the air intake 118 is illustrated as being provided in the outer body 116, in another embodiment the air intake may be provided in a coupler as described, for example, in U.S. patent application Ser. No. 13/841,233; Filed Mar. 15, 2013.

The cartridge 104 includes an outer body 126 with a mouth opening 128 at a mouthend 130 thereof to allow passage of air and entrained vapor (i.e., the components of the aerosol precursor composition in an inhalable form) from the cartridge to a consumer during draw on the aerosol delivery device 100. The aerosol delivery device 100 may be substantially rod-like or substantially tubular shaped or substantially cylindrically shaped in some embodiments. In other embodiments, further shapes and dimensions are encompassed—e.g., a rectangular or triangular cross-section, or the like.

The cartridge 104 further includes an atomizer 132 comprising a resistive heating element 134 (e.g., a wire coil) configured to produce heat and a liquid transport element 136 (e.g., a wick) configured to transport a liquid. Various embodiments of materials configured to produce heat when electrical current is applied therethrough may be employed to form the resistive heating element 134. Example materials from which the wire coil may be formed include Kanthal (FeCrAl), Nichrome, Molybdenum disilicide ($MoSi_2$), molybdenum silicide (MoSi), Molybdenum disilicide doped with Aluminum ($Mo(Si,Al)_2$), and ceramic (e.g., a positive temperature coefficient ceramic). Further to the above, representative heating elements and materials for use therein are described in U.S. Pat. No. 5,060,671 to Counts et al.; U.S. Pat. No. 5,093,894 to Deevi et al.; U.S. Pat. No. 5,224,498 to Deevi et al.; U.S. Pat. No. 5,228,460 to Sprinkel Jr., et al.; U.S. Pat. No. 5,322,075 to Deevi et al.; U.S. Pat. No. 5,353,813 to Deevi et al.; U.S. Pat. No. 5,468,936 to Deevi et al.; U.S. Pat. No. 5,498,850 to Das; U.S. Pat. No. 5,659,656 to Das; U.S. Pat. No. 5,498,855 to Deevi et al.; U.S. Pat. No. 5,530,225 to Hajaligol; U.S. Pat. No. 5,665,262 to Hajaligol; U.S. Pat. No. 5,573,692 to Das et al.; and U.S. Pat. No. 5,591,368 to Fleischhauer et al., the disclosures of which are incorporated herein by reference in their entireties.

Electrically conductive heater terminals 138 (e.g., positive and negative terminals) at the opposing ends of the heating element 134 are configured to direct current flow through the heating element and configured for attachment to the appropriate wiring or circuit (not illustrated) to form an electrical connection of the heating element with the battery 110 when the cartridge 104 is connected to the control body 102. Specifically, a plug 140 may be positioned at a distal attachment end 142 of the cartridge 104. When the cartridge 104 is connected to the control body 102, the plug 140 engages the coupler 120 to form an electrical connection such that current controllably flows from the battery 110, through the coupler and plug, and to the heating element 134. The outer body 126 of the cartridge 104 can continue across the distal attachment end 142 such that this end of the cartridge is substantially closed with the plug 140 protruding therefrom.

A reservoir may utilize a liquid transport element to transport an aerosol precursor composition to an aerosolization zone. One such example is shown in FIG. 1. As seen therein, the cartridge 104 includes a reservoir layer 144 comprising layers of nonwoven fibers formed into the shape of a tube encircling the interior of the outer body 126 of the cartridge, in this embodiment. An aerosol precursor composition is retained in the reservoir layer 144. Liquid components, for example, can be sorptively retained by the reservoir layer 144. The reservoir layer 144 is in fluid connection with a liquid transport element 136. The liquid transport element 136 transports the aerosol precursor composition stored in the reservoir layer 144 via capillary action to an aerosolization zone 146 of the cartridge 104. As illustrated, the liquid transport element 136 is in direct contact with the heating element 134 that is in the form of a metal wire coil in this embodiment.

It is understood that an aerosol delivery device that can be manufactured according to the present disclosure can encompass a variety of combinations of components useful in forming an electronic aerosol delivery device. Reference is made for example to the reservoir and heater system for controllable delivery of multiple aerosolizable materials in an electronic smoking article disclosed in U.S. patent application Ser. No. 13/536,438, filed Jun. 28, 2012, which is incorporated herein by reference in its entirety. Further, U.S. patent application Ser. No. 13/602,871, filed Sep. 4, 2012, discloses an electronic smoking article including a microheater, and which is incorporated herein by reference in its entirety.

In another embodiment substantially the entirety of the cartridge may be formed from one or more carbon materials, which may provide advantages in terms of biodegradability and absence of wires. In this regard, the heating element may comprise a carbon foam, the reservoir may comprise carbonized fabric, and graphite may be employed to form an electrical connection with the battery and controller. Such carbon cartridge may be combined with one or more elements as described herein for providing illumination of the cartridge in some embodiments. An example embodiment of a carbon-based cartridge is provided in U.S. patent application Ser. No. 13/432,406; filed Mar. 28, 2012, which is incorporated herein by reference in its entirety.

In use, when a user draws on the article 100, the heating element 134 is activated (e.g., such as via a flow sensor), and the components for the aerosol precursor composition are vaporized in the aerosolization zone 146. Drawing upon the mouthend 130 of the article 100 causes ambient air to enter the air intake 118 and pass through the central opening in the coupler 120 and the central opening in the plug 140. In the cartridge 104, the drawn air passes through an air passage 148 in an air passage tube 150 and combines with the formed vapor in the aerosolization zone 146 to form an aerosol. The aerosol is whisked away from the aerosolization zone 146, passes through an air passage 152 in an air passage tube 154, and out the mouth opening 128 in the mouthend 130 of the article 100.

The various components of an aerosol delivery device according to the present disclosure can be chosen from components described in the art and commercially available. Examples of batteries that can be used according to the disclosure are described in U.S. Pat. App. Pub. No. 2010/0028766, the disclosure of which is incorporated herein by reference in its entirety.

An exemplary mechanism that can provide puff-actuation capability includes a Model 163PC01D36 silicon sensor, manufactured by the MicroSwitch division of Honeywell, Inc., Freeport, Ill. Further examples of demand-operated electrical switches that may be employed in a heating circuit according to the present disclosure are described in U.S. Pat. No. 4,735,217 to Gerth et al., which is incorporated herein by reference in its entirety. Further description of current regulating circuits and other control components, including microcontrollers that can be useful in the present aerosol delivery device, are provided in U.S. Pat. Nos. 4,922,901, 4,947,874, and 4,947,875, all to Brooks et al., U.S. Pat. No. 5,372,148 to McCafferty et al., U.S. Pat. No. 6,040,560 to Fleischhauer et al., and U.S. Pat. No. 7,040,314 to Nguyen et al., all of which are incorporated herein by reference in their entireties.

The aerosol precursor, which may also be referred to as an aerosol precursor composition or a vapor precursor composition, can comprise one or more different components. For example, the aerosol precursor can include a polyhydric alcohol (e.g., glycerin, propylene glycol, or a mixture thereof). Representative types of further aerosol precursor compositions are set forth in U.S. Pat. No. 4,793,365 to Sensabaugh, Jr. et al.; U.S. Pat. No. 5,101,839 to Jakob et al.; PCT WO 98/57556 to Biggs et al.; and Chemical and Biological Studies on New Cigarette Prototypes that Heat Instead of Burn Tobacco, R. J. Reynolds Tobacco Company Monograph (1988); the disclosures of which are incorporated herein by reference.

Still further components can be utilized in the aerosol delivery device of the present disclosure. For example, U.S. Pat. No. 5,154,192 to Sprinkel et al. discloses indicators that may be used with smoking articles; U.S. Pat. No. 5,261,424 to Sprinkel, Jr. discloses piezoelectric sensors that can be associated with the mouth-end of a device to detect user lip activity associated with taking a draw and then trigger heating; U.S. Pat. No. 5,372,148 to McCafferty et al. discloses a puff sensor for controlling energy flow into a heating load array in response to pressure drop through a mouthpiece; U.S. Pat. No. 5,967,148 to Harris et al. discloses receptacles in a smoking device that include an identifier that detects a non-uniformity in infrared transmissivity of an inserted component and a controller that executes a detection routine as the component is inserted into the receptacle; U.S. Pat. No. 6,040,560 to Fleischhauer et al. describes a defined executable power cycle with multiple differential phases; U.S. Pat. No. 5,934,289 to Watkins et al. discloses photonic-optronic components; U.S. Pat. No. 5,954,979 to Counts et al. discloses means for altering draw resistance through a smoking device; U.S. Pat. No. 6,803,545 to Blake et al. discloses specific battery configurations for use in smoking devices; U.S. Pat. No. 7,293,565 to Griffen et al. discloses various charging systems for use with smoking devices; U.S. Pat. No. 8,402,976 to Fernando et al. discloses computer interfacing means for smoking devices to facilitate charging and allow computer control of the device; U.S. Pat. App. Pub. No. 2010/0163063 by Fernando et al. discloses identification systems for smoking devices; and WO 2010/003480 by Flick discloses a fluid flow sensing system indicative of a puff in an aerosol generating system; all of the foregoing disclosures being incorporated herein by reference in their entireties. Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,388,574 to Ingebrethsen; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. No. 8,156,944 to Hon; U.S. Pat. No. 8,365,742 to Hon; U.S. Pat. No. 8,375,957 to Hon; U.S. Pat. No. 8,393,331 to Hon; U.S. Pat. App. Pub. Nos. 2006/0196518 and 2009/0188490 to Hon; U.S. Pat. App. Pub. No. 2009/0272379 to Thorens et al.; U.S. Pat. App. Pub. Nos. 2009/0260641 and 2009/0260642 to Monsees et al.; U.S. Pat. App. Pub. Nos. 2008/0149118 and 2010/0024834 to Oglesby et al.; U.S. Pat. App. Pub. No. 2010/0307518 to Wang; WO 2010/091593 to Hon; WO 2013/089551 to Foo; and U.S. patent application Ser. No. 13/841,233, filed Mar. 15, 2013, each of which is incorporated herein by reference in its entirety. A variety of the materials disclosed by the foregoing documents may be incorporated into the present devices in various embodiments, and all of the foregoing disclosures are incorporated herein by reference in their entireties.

Any combination of elements as described above may be utilized in the preparation of an aerosol delivery device (specifically an electronic smoking article) according to embodiments of the present disclosure. The so-formed devices particularly can include a haptic feedback component, which itself may be an independent component of the device or may be combined with one or more further components of the aerosol delivery device. The combination of the haptic feedback component with one or more further components may cause the one or more further components to participate in providing the haptic feedback.

An exemplary embodiment of a smoking article 200 according to the present disclosure is shown in FIG. 2. As illustrated therein, a control body 202 can be formed of a housing 201 that can include a control component 206, a flow sensor 208, a battery 210, an LED 212, and a haptic feedback component 220, which can be variably aligned. A haptic driver 222 optionally may be included.

Haptic elements present in a smoking article according to the present disclosure can include any components adapted for providing tactile feedback in a form factor combinable with the size and shape of an electronic smoking article. A haptic feedback component particularly can be adapted to apply forces, vibrations, or motions to a user of the smoking article.

The haptic feedback component can be in electrical communication with the microcontroller or like element. Preferably, the microcontroller or like element can be adapted to instruct the haptic feedback component to generate the haptic feedback. For example, the instruction can direct the haptic feedback component to generate one or more different waveforms, which may vary across many different combinations of amplitude, frequency, and duration. Such waveforms may define relatively simple patterns, such as short pulses of constant intensity, or relatively complex patterns, such as pulses of increasing and decreasing intensity.

The instruction provided to the haptic feedback component may correspond to an input provided to the microcontroller. Such input may be a manual input from a user or an input resulting from a further function of the smoking article. For example, the input may include actuation of a power button or the like by a user, or the input may include the attachment of a cartridge to the control component. In further examples, the input may be a signal from a sensor or the like, such as relating to the fluid level of a reservoir, power delivery to a heater, or the like. A sensor may be present in addition to a flow sensor, as otherwise described herein.

Haptic feedback provided according to the present disclosure particularly may define a status of the smoking article. As non-limiting examples, haptic feedback may define a working status, such as heating of a heater to form an aerosol, powering up of the device, or powering down of the device. Haptic feedback may define a further status of the device, such as a low reservoir level for the aerosol precursor composition, failure of the device to function properly, proper connection of the control component to a cartridge, or the like. In some embodiments, haptic feedback may be independent of device status. For example, the haptic feedback may be provided to enhance the user experience with the device.

In light of the form factor of an electronic smoking article, a haptic feedback component may be adapted to function utilizing only the electrical current delivered by the microcontroller. In some embodiments, however, it can be useful to include a haptics driver, and such driver optionally may be combined with the microcontroller or be an independent element. More particularly, the driver may be an external differential amplifier or integrated into a single integrated circuit (IC) along with a haptics processor. The haptics driver may incorporate techniques such as overdrive (e.g., where a motor is overdriven to reduce the time it takes to reach its nominal vibration level) and active braking (e.g., where the motor is slowed to rest quicker by applying a reverse voltage for appropriate length). Incorporation of such techniques specifically can be useful to enable the haptics processor to automatically handle the electrical signaling.

The haptic feedback component can include a variety of elements adapted to provide haptic feedback. In some embodiments, the haptic feedback component can be a vibrating haptic actuator—e.g., an element adapted to provide mechanical motion in response to an electrical stimulus, such as arising from an input as otherwise described herein. Such component also may be described as a vibration transducer and can encompass any device adapted to transform an electrical input to a vibration output. One example of a vibrating haptic actuator is an eccentric rotating mass (ERM) motor, such as where an unbalanced weight is rotated around a motor shaft to cause motor displacement that translates into vibration. Most ERM motors advantageously can be powered with direct current. Electromagnetic vibratory motors may be used. An ERM motor can be adapted for simple vibration or may be coupled with a suitable processor driver IC, which can be programmed to vary motor speed to control vibration amplitude and frequency and thus the manner of waveform generated by the smoking article.

In further embodiments, a vibrating haptic actuator useful in a smoking article as described herein can be a linear resonant actuator (LRA). Such devices typically include an internal magnetic mass and spring, and an electrical current in a voice coil causes the mass to displace.

Vibrating haptic actuators, such as ERM motors and LRAs, can be provided in a variety of form factors. For example, the vibrating haptic actuator can be in a cylindrical form factor. In some embodiments, the vibrating haptic actuator can be in a coin form factor (i.e., be substantially shaped like a coin). Linear form factors also are encompassed.

In some embodiments, a vibrating haptic actuator can be adapted to substantially vibrate the entire electronic smoking article. In other words, the vibrating haptic actuator may not be coordinate specific. In other embodiments, a vibrating haptic actuator useful in a smoking article may be adapted for touch-coordinate specific responses and thus can enable localized haptic effects at a specific location on an electronic smoking article. A vibrating haptic actuator useful according to the present disclosure thus can include further technologies that particularly may enable touch-coordinate specific response. For example, in some embodiments, a vibrating haptic actuator can be adapted for electroactive polymer actuation. In some embodiments, a vibrating haptic actuator can be adapted for piezoelectric actuation. In some embodiments, a vibrating haptic actuator can be adapted for electrostatic actuation. In some embodiments, a vibrating haptic actuator can be adapted for audio wave actuation. Exemplary elements for causing vibration in a device are described in U.S. Pat. No. 5,515,842 to Ramseyer et al.; U.S. Pat. No. 6,196,219 to Hess et al.; U.S. Pat. No. 7,775,459 to Martens, III et al.; U.S. Pat. No. 7,845,359 to Montaser; and U.S. Pat. No. 8,127,772 to Montaser, the disclosures of which are incorporated herein by reference in their entireties.

In certain embodiments, a haptic feedback component useful according to the present disclosure can be adapted to provide touch-coordinate specific responses as well as customizable haptic effects—e.g., defined waveforms. The customizable effects in particular can be generated through use of a low latency microcontroller or IC.

In other embodiments, the haptic feedback component can utilize technology that does not require the use of an actuator. For example, the haptic feedback component can be adapted for reverse-electrovibration wherein a weak current is sent from the device to the ground, and the oscillating electric field around the skin in contact with the device creates a variable sensation of friction depending on the shape, frequency, and amplitude of the signal. In even further embodiments, the haptic feedback component can be adapted for pressure sensitivity wherein the level of force on the smoking article affects the vibratory response.

The haptic feedback component can be sized and dimensioned to fit within a generally cylindrical housing. In some embodiments, the haptic feedback component can have a width or diameter of about 8 mm or less, about 7 mm or less, or about 6 mm or less, for example about 2 mm to about 8 mm, about 3 mm to about 7 mm, or about 4 mm to about 6 mm. The haptic feedback component can have a length of about 15 mm or less, about 10 mm or less, or about 5 mm or less, for example about 2 mm to about 15 mm, about 3 mm to about 12 mm, or about 4 mm to about 10 mm.

Returning to FIG. 2, a smoking article according to the present disclosure also may comprise a cartridge 204. The cartridge 204 can be formed of a housing 203 enclosing a reservoir 244 that is in fluid communication with a transport element 236 adapted to wick or otherwise transport an aerosol precursor composition stored in the reservoir to a heater 234. An opening 228 may be present in the cartridge housing 203 to allow for egress of formed aerosol from the cartridge 204. Such components are representative of the components that may be present in a cartridge and are not intended to limit the scope of cartridge components that are encompassed by the present disclosure. The cartridge 204 may be adapted to engage the control body 202 through a press-fit engagement between the control body projection 224 and the cartridge receptacle 240. Such engagement can facilitate a stable connection between the control body 202 and the cartridge 204 as well as establish an electrical connection between the battery 210 and control component 206 in the control body and the heater 234 in the cartridge. The cartridge 204 also may include one or more electronic components 250, which may include an IC, a memory component, a sensor, or the like. The electronic component 250 may be adapted to communicate with the haptic feedback component 220 and/or the control component 206 so as to provide an input. Moreover, the electronic component 250 may comprise a haptic feedback component.

In light of the foregoing, the present disclosure also relates to a method for providing haptic feedback in an electronic smoking article. In some embodiments, a method according to the disclosure can comprise providing an electronic smoking article as described herein. In particular, the electronic smoking article can comprise a housing including a haptic feedback component and a microcontroller. The method further can comprise generating an input to the microcontroller. The generating step can be a manual function by a user (e.g., pressing a button or touching a capacitive screen on the device) or may be an automated function arising from the general use of the device by an individual (e.g., heating of the heater when a user draws on the device). The method also can comprise delivering an instruction from the microcontroller to the haptic feedback component. A single instruction may be provided, or the microcontroller may be adapted to provide a number of different instructions, which may vary based upon the input provided. Further, the method can comprise generating one or more different waveforms from the haptic feedback component. The waveforms can directly correspond to the instruction from the microcontroller and thus can vary based upon the input provided.

The one or more different waveforms may particularly define a status of the electronic smoking article. The status of the electronic smoking article can relate to a function of the device. For example, when a user draws on the smoking article so as to cause the heater to heat and thus form an aerosol, the haptic feedback component may generate a waveform (e.g., a vibration or buzzing effect) that alerts the user to the working status of the device. As such, the status defined by the waveform is that the device is properly functioning or is in a heating state. In another example, when a user attaches a cartridge to a control body, the haptic feedback component may generate a waveform (e.g., one or more vibrations that may vary in intensity through the duration of the vibration) that alerts the user that the cartridge is in a working connection with the control body and may be used for typical operation.

The status of the electronic smoking article also can relate to a qualitative factor. For example, a smoking article according to the present disclosure may include one or more sensors that may monitor a condition, such as the amount of aerosol precursor composition remaining in a reservoir or the power remaining in a battery. When the amount of aerosol precursor composition in the reservoir or the battery power falls below a defined level, the haptic feedback component may generate a waveform that alerts the user to the low aerosol precursor composition status or low battery status of the device. Different waveforms may be predetermined to correspond to a specific status of the device, and a user may be able to quickly identify the status based upon the waveform that is generated.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. An electronic smoking article comprising:
- a housing;
- a control component within the housing;
- a haptic feedback component within the housing;
- a haptic driver within the housing;
- a heater within the housing; and
- a reservoir within the housing and containing an aerosol precursor composition;
- wherein the control component is configured to deliver instruction to the haptic feedback component via the haptic driver, the instruction being effective to cause the haptic feedback component to generate a defined waveform; and
- wherein the haptic driver is in electrical communication with the control component and the haptic feedback component such that the control component and the haptic driver direct the haptic feedback component to form haptic feedback that is defined by one or more different waveforms.

2. The electronic smoking article of claim 1, wherein the haptic feedback component is configured to apply vibrations to a user.

3. The electronic smoking article of claim 1, wherein the haptic feedback component is configured to apply forces or motions to a user.

4. The electronic smoking article of claim 1, wherein the one or more different waveforms directly correspond to an instruction from the control component.

5. The electronic smoking article of claim 4, wherein the one or more different waveforms vary based upon an input provided to the control component.

6. The electronic smoking article of claim 1, wherein the one or more different waveforms are predetermined to correspond to a specific status of the electronic smoking article.

7. The electronic smoking article of claim 1, wherein the haptic driver is combined with the control component.

8. The electronic smoking article of claim 1, wherein the haptic driver is programmed to vary motor speed to control vibration amplitude and frequency to generate the defined waveform.

9. The electronic smoking article of claim 1, wherein the haptic feedback component is configured to not be coordinate specific.

10. The electronic smoking article of claim 1, wherein the haptic feedback component is adapted for touch-coordinate specific responses that enable localized haptic effects at a specific location on the control body.

11. The electronic smoking article of claim 1, wherein the haptic feedback component is a vibrating haptic actuator.

12. The electronic smoking article of claim 11, wherein one or more of the following conditions is met:
- the vibrating haptic actuator comprises a linear resonant actuator (LRA);
- the vibrating haptic actuator is adapted for electroactive polymer actuation;
- the vibrating haptic actuator is adapted for piezoelectric actuation;
- the vibrating haptic actuator is adapted for electrostatic actuation;
- the vibrating haptic actuator is adapted for audio wave actuation;
- the vibrating haptic actuator is a vibration transducer.

13. The electronic smoking article of claim 1, further comprising a flow sensor within the housing.

14. The electronic smoking article of claim 1, wherein the haptic driver is configured for overdrive operation so as to reduce a time required to reach a nominal vibration level.

* * * * *